(12) United States Patent
Alaettinoglu et al.

(10) Patent No.: US 11,777,841 B2
(45) Date of Patent: Oct. 3, 2023

(54) HANDLING DIVERSITY CONSTRAINTS WITH SEGMENT ROUTING AND CENTRALIZED PCE

(71) Applicant: Ciena Corporation, Hanover, MD (US)

(72) Inventors: Cengiz Alaettinoglu, Sherman Oaks, CA (US); Amal Karboubi, Ottawa (CA); Himanshu Shah, Hopkinton, MA (US); Muthurajah Sivabalan, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/462,544

(22) Filed: Aug. 31, 2021

(65) Prior Publication Data

US 2023/0067946 A1 Mar. 2, 2023

(51) Int. Cl.
*H04L 45/28* (2022.01)
*H04L 45/00* (2022.01)

(52) U.S. Cl.
CPC .............. *H04L 45/28* (2013.01); *H04L 45/22* (2013.01)

(58) Field of Classification Search
CPC .................................. H04L 45/28; H04L 45/22
See application file for complete search history.

(56) References Cited

U.S. PATENT DOCUMENTS

| 7,430,176 | B2 | 9/2008 | Nalawade et al. |
| 7,684,351 | B2 | 3/2010 | Vasseur et al. |
| 7,940,650 | B1 * | 5/2011 | Sandhir ............ H04L 45/28 370/219 |
| 9,979,629 | B2 | 5/2018 | Sivabalan et al. |
| 10,033,623 | B2 | 7/2018 | Jain et al. |
| 10,158,558 | B1 | 12/2018 | Ward et al. |
| 10,165,093 | B2 | 12/2018 | Filsfils et al. |
| 10,171,338 | B2 | 1/2019 | Filsfils et al. |
| 10,250,494 | B2 | 4/2019 | Sivabalan et al. |
| 10,277,558 | B2 | 4/2019 | Khan et al. |
| 10,291,516 | B2 | 5/2019 | Bryant et al. |
| 10,404,600 | B2 * | 9/2019 | Shakir ............ H04L 47/125 |
| 10,454,821 | B2 | 10/2019 | Filsfils et al. |
| 10,567,295 | B2 | 2/2020 | Barton et al. |
| 10,740,408 | B2 | 8/2020 | Ramasamy et al. |
| 10,833,976 | B2 | 11/2020 | Saad et al. |
| 10,868,755 | B2 | 12/2020 | Filsfils et al. |

(Continued)

FOREIGN PATENT DOCUMENTS

EP 3 038 301 B1 3/2020

*Primary Examiner* — Chris Parry
*Assistant Examiner* — Dixon F Dabipi
(74) *Attorney, Agent, or Firm* — Baratta Law PLLC; Lawrence A. Baratta, Jr.

(57) ABSTRACT

A method implemented in a network element includes, for a service, receiving a Segment Identifier (SID) list and an explicit list for an intended path in a Segment Routing network; expanding the SID list and comparing the expanded SID list to the explicit list; and setting the intended path as either valid or invalid based on the comparing. The intended path can be a primary path, and the steps can further include receiving a SID list and an explicit list for a backup path in the Segment Routing network. The steps can further include switching to the backup path responsive to a failure on the primary path, and switching back to the primary path responsive to it being valid.

20 Claims, 4 Drawing Sheets

(56) References Cited

U.S. PATENT DOCUMENTS

| | | | |
|---|---|---|---|
| 2014/0369356 A1* | 12/2014 | Bryant | H04L 45/745 |
| | | | 370/392 |
| 2016/0057049 A1 | 2/2016 | Jacobson et al. | |
| 2016/0191324 A1 | 6/2016 | Olofsson et al. | |
| 2017/0064717 A1* | 3/2017 | Filsfils | H04L 45/50 |
| 2019/0297017 A1 | 9/2019 | Pignataro et al. | |
| 2019/0356600 A1* | 11/2019 | Barton | H04L 45/28 |
| 2019/0379601 A1 | 12/2019 | Khan et al. | |
| 2020/0112495 A1 | 4/2020 | Attarwala et al. | |
| 2020/0153856 A1 | 5/2020 | Nainar et al. | |
| 2020/0220811 A1 | 7/2020 | Shah | |
| 2021/0067441 A1* | 3/2021 | Hari | H04L 49/25 |
| 2021/0092043 A1 | 3/2021 | Filsfils et al. | |
| 2021/0160174 A1 | 5/2021 | Kashyap et al. | |
| 2021/0243095 A1 | 8/2021 | Attarwala et al. | |
| 2022/0053072 A1* | 2/2022 | Filsfils | H04L 69/04 |
| 2022/0103463 A1* | 3/2022 | Margaria | H04L 45/02 |

* cited by examiner

HANDLING DIVERSITY CONSTRAINTS WITH SEGMENT ROUTING AND CENTRALIZED PCE

FIELD OF THE DISCLOSURE

The present disclosure generally relates to networking. More particularly, the present disclosure relates to systems and methods for handling diversity constraints with Segment Routing and a centralized Path Computation Element (PCE).

BACKGROUND OF THE DISCLOSURE

Network operators or service providers can offer diverse path services to customers for extra resiliency. Existing approach for an end-to-end diverse path service use Multiprotocol Label Switching-Transport Profile (MPLS-TP), which in turn utilizes Resource Reservation Protocol-Traffic Engineering (RSVP-TE). Segment Routing (SR) introduces new challenges for providing diverse paths. A valid SR path may diverge from the path a PCE computed and consume resources on routers and links it was not meant to. With Segment Routing, because of the on-router computation of shortest paths, a service's current path and intended path may deviate after some link or router failures and/or repairs. One way to fix this problem is for a PCE to signal a new Segment Identifier (SID) list when this happens. However, this usually takes tens of seconds. There is a need to support diversity constraints with Segment Routing.

BRIEF SUMMARY OF THE DISCLOSURE

The present disclosure relates to systems and methods for handling diversity constraints with Segment Routing and a centralized Path Computation Element (PCE). Specifically, a head-end router using the approach described herein can keep traffic either on the intended primary or intended secondary path where Traffic Engineering (TE) constraints (such as bandwidth, affinity, delay, etc.) are guaranteed, but not on unintended paths which may not respect the user provided constraints. The present disclosure includes signals both the compressed SID list and the intended full path (similar to an RSVP-TE Explicit Route Object (ERO)) and changes the validity rule for an SR Policy at the head-end router. The compressed SID list, when expanded by the head-end router, may or may not be identical to the intended path as the network topology changes. The candidate path is now considered invalid when this expansion is not identical to the explicitly specified intended path.

In various embodiments, a method having steps implemented by a network element, a network element configured to implement the steps, and a non-transitory computer-readable medium includes instructions stored thereon for programming a network element are disclosed. The steps include, for a service, receiving a Segment Identifier (SID) list and an explicit list for an intended path in a Segment Routing network; expanding the SID list and comparing the expanded SID list to the explicit list; and setting the intended path as either valid or invalid based on the comparing.

The intended path can be a primary path, and the steps can further include receiving a SID list and an explicit list for a backup path in the Segment Routing network. The steps can further include switching to the backup path responsive to invalidity of the primary path; and switching back to the primary path responsive to it being valid. The receiving can be from a Path Computation Element (PCE). The receiving can be by the network element which is a head-end router for the service. The SID list can be compressed and the explicit list can include every network element for the intended path. The intended path can be valid when the expanded SID matches the explicit list.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
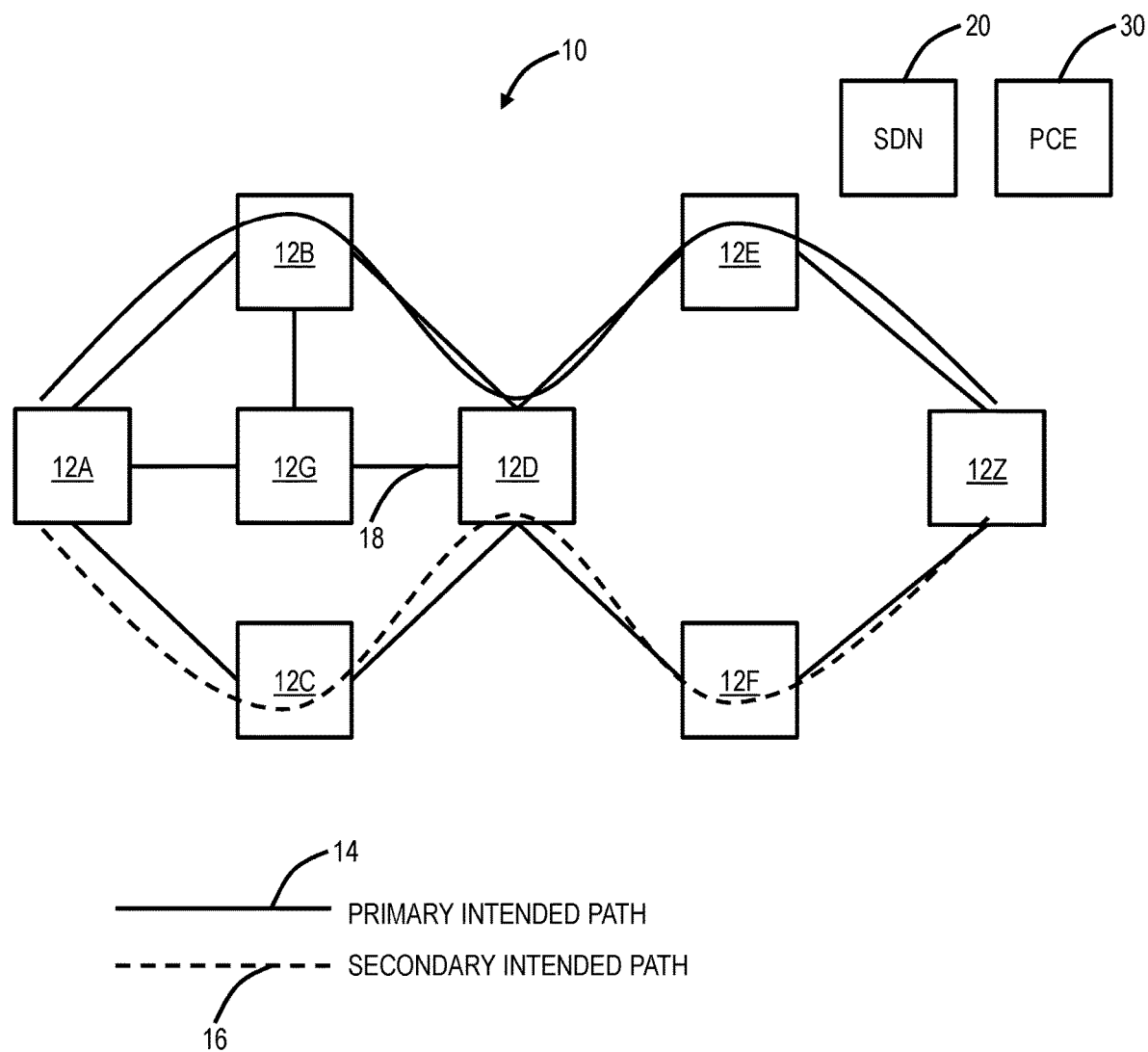
FIG. 1 is a network diagram of a network including network elements illustrating paths at service creation.

Again, the present disclosure relates to systems and methods for handling diversity constraints with Segment Routing and a centralized Path Computation Element (PCE). Specifically, a head-end router using the approach described herein can keep traffic either on the intended primary or intended secondary path where Traffic Engineering (TE) constraints (such as bandwidth, affinity, delay, etc.) are guaranteed, but not on unintended paths which may not respect the user provided constraints. The present disclosure includes signals both the compressed SID list and the intended full path (similar to an RSVP-TE Explicit Route Object (ERO)) and changes the validity rule for an SR Policy at the head-end router. The compressed SID list, when expanded by the head-end router, may or may not be identical to the intended path as the network topology changes. The candidate path is now considered invalid when this expansion is not identical to the explicitly specified intended path.

Segment Routing Overview

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each segment is represented by a Segment Identifier (SID).

In SR-MPLS, all SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SR-MPLS, SRGB is a local property of a node and identifies the set of local labels reserved for global segments. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by an adjacency SID, which represents a specific adjacency, such as egress interface, to a neighboring router. The adjacency SID is distributed by ISIS or OSPF. The adjacency segment steers the traffic to a specific adjacency.

An anycast segment is a type of prefix segment that represents an anycast group. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group. An anycast SID also enables load balancing and Equal Cost Multipath (ECMP).

SR-MPLS utilizes MPLS labels for the SID, whereas SRv6 utilizes an IPv6 address for a SID, i.e., when an SRv6 SID is in the Destination Address field of an IPv6 header of a packet, it is routed through an IPv6 network as an IPv6 address. Note, various example embodiments described herein are presented with reference to SR-MPLS, but those skilled in the art will recognize SRv6 is also contemplated.
Example Network FIG. 1 is a network diagram of a network 10 including network elements 12A, 12B, 12C, 12D, 12E, 12F, 12G, 12Z illustrating paths 14, 16 at service creation. As described herein, the network elements 12 can be nodes, switches, routers, etc. implementing Segment Routing. In this example, for illustration purposes, it is assumed all link metrics or costs are equal, and every link 18 has sufficient bandwidth for the service, except the link 18 between the network elements 12D, 12G.

A diverse-path service request, along with the bandwidth reservation and other constraints, can be made via a northbound interface to a Software Defined Networking (SDN) controller 20 such as via a Network Management System (NMS). The SDN controller manages the lifecycle of these services. The SDN controller 20 can host a PCE 30 and track available bandwidth and other TE link characteristics on a model of the network topology it maintains. Using this model, a PCE 30 computes two (or more) paths 14, 16 for the service that satisfy the service's intent (e.g., have sufficient capacity) and are diverse from each other. Usually, one of these paths is the primary path 14 and the rest are backup paths. We do not describe multiple backup paths any further; but the present disclosure applies to both single and multiple backup paths.

The present disclosure also applies when the path computation is done by the head-end routers, e.g., the network element 12A. In this case, some constraints are not possible (e.g., bandwidth reservation). For illustration purposes, we only describe the present disclosure using a PCE for brevity.

These initial paths 14, 16 are optimum with respect to the service intent at the time of their computation; that is, the PCE 30 computes the best paths available according to the network state and available capacity at that time. We call these the intended paths 14, 16 of the service. The service will be placed on one of these paths referred to as the primary path 14 and the other will serve as a backup path 16 when a failure on the primary path 14 is detected. The failure can be detected using standard Interior Gateway Protocol (IGP) (such as Open Shortest Path First (OSPF) and Intermediate System-Intermediate System (ISIS)) mechanisms or using an Operations, Administration, and Maintenance (OAM) protocol such a Bidirectional Forwarding Detection (BFD). Also, failure is one condition, but invalidity of primary path can occur even without failure, e.g., a shorter path because of a repair or new link that satisfies the compressed SID list but is not same at intended path. Thus, invalidity includes the failure of the path as well as other conditions.

The SDN controller 20 then converts these paths into an SR Policy object as defined in Segment Routing Policy Architecture, draft-ietf-spring-segment-routing-policy-08, Jul. 7, 2020, available online at datatracker.ietf.org/doc/html/draft-ietf-spring-segment-routing-policy-08, the contents of which are incorporated by reference in their entirety. The SR Policy object has the following rough structure:

Destination prefix, color
Candidate path 1 (preference 1)
  SID list 1
  SID list 2
  ...
  SID list n
Candidate path 2 (preference 2)
  SID list 1
  SID list 2
  ...
  SID list n
...
Candidate path 3 (preference 3)
  SID list 1
  SID list 2
  ...
  SID list n The destination is typically the egress router of the traffic, namely the network element 12Z. Color represents a service type and allows specifying a distinct path for that type (e.g., color 10 can indicate a low delay path). Color is not relevant to the present disclosure and is not further discussed. Per the specification, a router uses the first candidate path that is valid (correctly specified and available according to network's routing) and has the highest preference. Each of the SID list under a candidate path describes an SR-encoded path. A candidate path as a result is a collection of paths and the traffic is split either equally or unequally among them according to policy (not shown here).

For our diverse path application, the SDN controller 30 converts the two intended paths 14, 16 it computed into two SID lists and places them under two candidate paths as follows:

Destination prefix, color x
Candidate path 1 preference 100
    SID list for primary path
Candidate path 2 preference 50
    SID list for backup path Each SID list is compressed in that it does not fully specify the path. In the most compressed case, it may use just a single SID for the tail-end of the service. In the most complete case, it can list every router and the link along the path. The latter is often not feasible due to the hardware limitations of routers. As a result, the compressed SID list ends up explicitly encoding some of the nodes and/or links of the path and implicitly specifying the nodes and/or links in between these explicit pieces. As described herein, a compressed SID list can include any of prefix SIDs, node SIDs, and anycast SIDs. The implicit pieces are the shortest paths according to network's routing between the explicit pieces. The implicit pieces are the segments in the name segment routing. The compressed SID list is computed by controller 30 so that, running shortest path between these SIDs will guarantee that path chosen by routers will be same as the intended path 14, 16.

To encode the SID list, the SDN controller 20 needs to know the network topology and shortest path behavior to the same level of detail as the routers. To do this, it needs to participate in network's routing, such as ISIS and OSPF, and implement the same path computation as the routers do. ISIS and OSPF topology can also be learned indirectly via another routing protocol, for example by using the link state address family in BGP. The implementation described herein allows either approach.

The SDN controller 20 then installs this SR Policy object to the head-end router of the service using either a Command Line Interface (CLI), Netconf/Yang, or a signaling protocol such as Path Computation Element Communications Protocol (PCEP).

Note that the head-end router (the network element 12A) is only aware of the two SID lists, not the actual intended paths 14, 16. The head-end router will compute the path of the first segment, i.e., the shortest path to the first SID in the first valid candidate path, and send the service's packets on this path. The packets include the remainder of the SID list. The router at the other end of that segment repeats the process for the next segment until all the SID list is exhausted.

FIG. 1 illustrates example diverse paths 14, 16 for a service from node A to Z. In this example, the path 14 includes a SID list for the network elements 12B, 12E, 12Z, and the path 16 includes a SID list for the network elements 12C, 12F, 12Z.

Path Deviation

Because of the on-router computation of shortest paths, the service's current path and intended path 14, 16 may deviate after some link or router failures and/or repairs. This can happen as a result of a link or a router failure on the intended path, or without any failure on the intended path as well.

Figure 2:
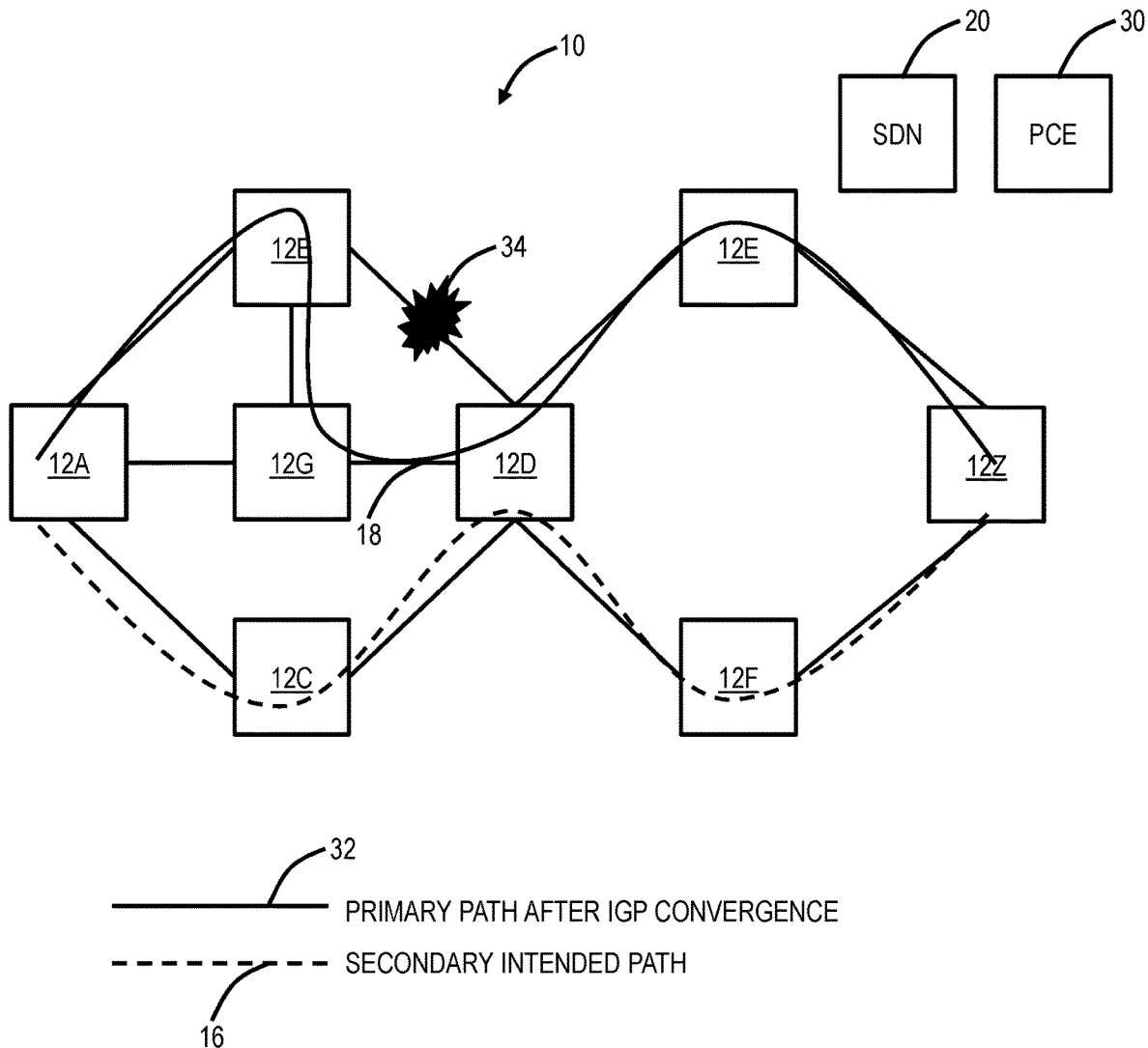
FIG. 2 is a network diagram of the network illustrating a primary path that diverges from the intended primary path after a IGP convergence after a link failure.

FIG. 2 is a network diagram of the network 10 illustrating a primary path 32 that diverges from the intended primary path 14 after a IGP convergence after a link failure 34. Here, the sequence events is described when the link between network elements 12B, 12D fails. Assume the network element 12A uses BFD for fast failure detection.

1) BFD detects that the candidate path 14 failed.
2) the network element 12A switches to the candidate path 16 (backup path).
3) the network element 12B detects the link between network elements 12B, 12D has failed (this can be detected before, after, or at the same time as 1; but it does not matter for our discussion) and may run Topology-Independent Loop-Free Alternate (TI-LFA), if applicable.
4) the network element 12B floods in IGP that the link between network elements 12B, 12D has failed.
5) the network elements 12A, 12B run Shortest Path First (SPF) again with the link between network elements 12B, 12D.
6) the network element 12A concludes candidate path 32 is still valid but is now expanding to network elements 12A, 12B, 12G, 12D, 12E, 12Z.
7) the service switches back to candidate path 32 (primary) which is not the intended primary path 14 in FIG. 1.

The step 7) creates a problem. The B-G link or G-D link may not satisfy the intent. In our example, G-D link does not have sufficient bandwidth and will drop packets.

Solution

The present disclosure changes two aspects of the SR policy behavior to solve this problem:

1) The PCE 30 signals the intended path along with the SID list. The intended path is signaled in a new object (represented either in PCEP or in SR YANG model). It contains explicit list of routers and interfaces along the path. This is similar to the RSVP-TE ERO object. The SID list stays the same.

2) The head-end router marks a candidate path as invalid if it deviates from the intended path signaled. That is, the head-end router expands the SID list by computing the full list of segments, then it compares this expansion against the intended path it received from the SDN controller 20, it then marks the candidate path as invalid if the two paths do not match. Head-end router repeats this validity tests each time it runs SPF (usually due to a topology change).

Figure 3:
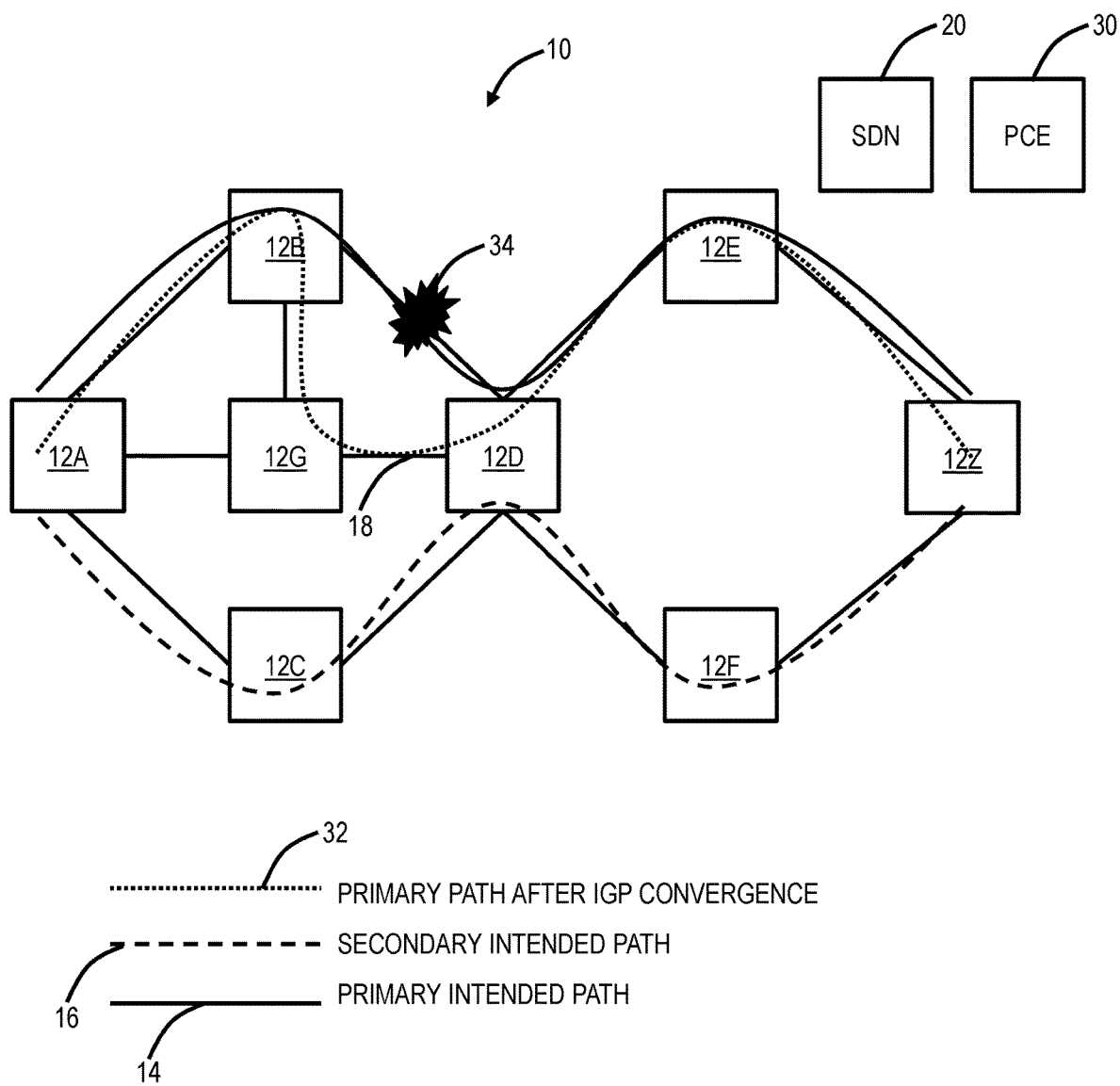
FIG. 3 is a network diagram of the network illustrating expansion of the SID list to detect divergence from the intended path.

The head-end router continues to use the highest-preference valid candidate path. However, it will now use additional criteria before declaring a candidate path as valid. FIG. 3 is a network diagram of the network 10 illustrating expansion of the SID list to detect divergence from the intended path.

For example, in FIG. 3, the network element 12A will receive both the SID lists for the network elements 12B, 12E, 12Z and the intended path 14 for the network elements 12A, 12B, 12D, 12E, 12Z. The network element 12A then expands the SID list for the network elements 12B, 12E, 12Z, and, because of the failure 34, this path is the network elements 12A, 12B, 12G, 12D, 12E, 12Z, and the network element 12A marks the first candidate path as invalid as it does not equal the intended path 14. As a result, it does not switch back in step 7 above to the primary path 32 forcing the traffic to stay on its backup path 16. Eventually, when the link between the network elements 12B, 12G is repaired, the network element 12A will expand the SID list for the network elements 12B, 12E, 12Z into the intended path 14—i.e., the network elements 12A, 12B, 12D, 12E, 12Z and mark the primary path 14 as valid and switch back.

There can be proprietary extensions to PCEP protocol and Netconf/YANG SR model for signaling the intended path. It is also possible to IETF standardization process.

Process

Figure 4:
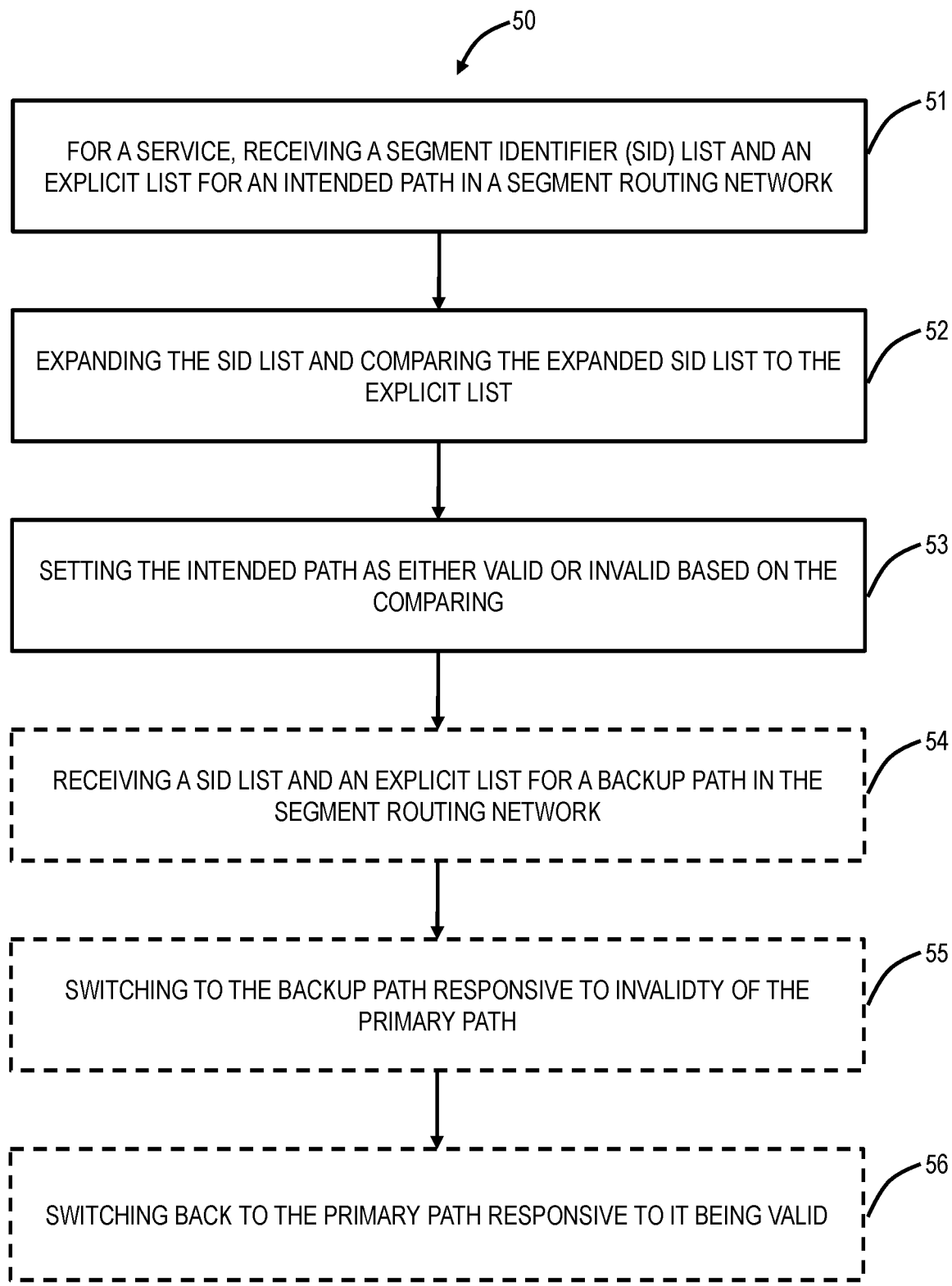
FIG. 4 is a flowchart of a process implemented in a network element.

FIG. 4 is a flowchart of a process 50 implemented in a network element 12A. The process 50 can be a method having steps implemented by the network element 12A, implemented by circuitry in the network element 12A, and as a non-transitory computer-readable medium storing instructions.

The process 50 includes, for a service, receiving a Segment Identifier (SID) list and an explicit list for an intended path in a Segment Routing network (step 51); expanding the SID list and comparing the expanded SID list to the explicit list (step 52); and setting the intended path as either valid or invalid based on the comparing (step 53).

The intended path can be a primary path, and wherein the steps further include receiving a SID list and an explicit list for a backup path in the Segment Routing network (step 54). The steps can further include switching to the backup path responsive to invalidity of the primary path (step 55); and switching back to the primary path responsive to it being valid (step 56).

The receiving can be from a Path Computation Element (PCE). The receiving can be from the network element which is a head-end router for the service. The SID list can be compressed and the explicit list can include every network element for the intended path. The intended path can be valid when the expanded SID matches the explicit list.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming a network element to perform steps of:
    for a service, receiving a Segment Identifier (SID) list and an explicit list for an intended path in a Segment Routing network;
    expanding the SID list and comparing the expanded SID list to the explicit list; and
    setting the intended path as either valid or invalid based on the comparing where the intended path is invalid when the expanded SID list is not identical to the explicit list such that the intended path does not match a path from the expanded SID list.

2. The non-transitory computer-readable medium of claim 1, wherein the intended path is a primary path, and wherein the steps further include
    receiving a SID list and an explicit list for a backup path in the Segment Routing network.

3. The non-transitory computer-readable medium of claim 2, wherein the steps further include
    switching to the backup path responsive to invalidity of the primary path; and
    switching back to the primary path responsive to it being valid.

4. The non-transitory computer-readable medium of claim 1, wherein the receiving is from a Path Computation Element (PCE).

5. The non-transitory computer-readable medium of claim 1, wherein the receiving is by the network element which is a head-end router for the service.

6. The non-transitory computer-readable medium of claim 1, wherein the SID list is compressed and the explicit list includes every network element for the intended path.

7. The non-transitory computer-readable medium of claim 1, wherein the intended path is valid when the expanded SID matches the explicit list.

8. A method implemented in a network element comprising steps of:
    for a service, receiving a Segment Identifier (SID) list and an explicit list for an intended path in a Segment Routing network;
    expanding the SID list and comparing the expanded SID list to the explicit list; and
    setting the intended path as either valid or invalid based on the comparing where the intended path is invalid when the expanded SID list is not identical to the explicit list such that the intended path does not match a path from the expanded SID list.

9. The method of claim 8, wherein the intended path is a primary path, and wherein the steps further include receiving a SID list and an explicit list for a backup path in the Segment Routing network.

10. The method of claim 9, wherein the steps further include
switching to the backup path responsive to invalidity of the primary path; and
switching back to the primary path responsive to it being valid.

11. The method of claim 8, wherein the receiving is from a Path Computation Element (PCE).

12. The method of claim 8, wherein the receiving is by the network element which is a head-end router for the service.

13. The method of claim 8, wherein the SID list is compressed and the explicit list includes every network element for the intended path.

14. The method of claim 8, wherein the intended path is valid when the expanded SID matches the explicit list.

15. A network element comprising circuitry configured to:
for a service, receive a Segment Identifier (SID) list and an explicit list for an intended path in a Segment Routing network,
expand the SID list and comparing the expanded SID list to the explicit list, and
set the intended path as either valid or invalid based on the comparing where the intended path is invalid when the expanded SID list is not identical to the explicit list such that the intended path does not match a path from the expanded SID list.

16. The network element of claim 15, wherein the intended path is a primary path, and wherein the circuitry is further configured to
receive a SID list and an explicit list for a backup path in the Segment Routing network.

17. The network element of claim 16, wherein the circuitry is further configured to
switch to the backup path responsive to invalidity of the primary path, and
switch back to the primary path responsive to it being valid.

18. The network element of claim 15, wherein the SID list and the explicit list is received from a Path Computation Element (PCE).

19. The network element of claim 15, wherein the SID list and the explicit list is received by the network element which is a head-end router for the service.

20. The network element of claim 15, wherein the SID list is compressed and the explicit list includes every network element for the intended path.

* * * * *